United States Patent
Chen et al.

(10) Patent No.: US 7,464,069 B2
(45) Date of Patent: Dec. 9, 2008

(54) SYSTEM AND METHOD FOR EAGER RELATIONSHIP CACHING OF ENTITY BEANS

(75) Inventors: Michael Chen, Santa Clara, CA (US); Seth White, San Francisco, CA (US)

(73) Assignee: Bea Systems, Inc., Redwood Shores, CA (US)

(*) Notice: Subject to any disclaimer, the term of this patent is extended or adjusted under 35 U.S.C. 154(b) by 377 days.

(21) Appl. No.: 10/369,433

(22) Filed: Feb. 19, 2003

(65) Prior Publication Data

US 2003/0182307 A1  Sep. 25, 2003

Related U.S. Application Data

(60) Provisional application No. 60/358,785, filed on Feb. 21, 2002.

(51) Int. Cl.
*G06F 7/00* (2006.01)
*G06F 17/30* (2006.01)
(52) U.S. Cl. .................... 707/2; 707/3; 707/5
(58) Field of Classification Search ............... 707/1–10, 707/100–104.1, 200–205; 709/315
See application file for complete search history.

(56) References Cited

U.S. PATENT DOCUMENTS

| | | | |
|---|---|---|---|
| 6,269,373 B1 | 7/2001 | Apte et al. ................... 707/10 |
| 6,292,933 B1 | 9/2001 | Bahrs et al. ................... 717/1 |
| 6,615,199 B1 * | 9/2003 | Bowman-Amuah .......... 706/50 |
| 6,728,726 B1 * | 4/2004 | Bernstein et al. ............ 707/204 |
| 6,748,373 B2 * | 6/2004 | Messinger et al. ............. 707/2 |
| 2003/0028682 A1 * | 2/2003 | Sutherland ................. 709/315 |

OTHER PUBLICATIONS

Xreferplus Search for definition of tag printed on Jan. 23, 2006 Included.*

* cited by examiner

*Primary Examiner*—Hosain T Alam
*Assistant Examiner*—Navneet K Ahluwalia
(74) *Attorney, Agent, or Firm*—Fliesler Meyer LLP

(57) ABSTRACT

A system and method for increasing entity bean performance in an application server environment. The system reduces the need for multiple or unnecessary queries by formulating a join query for the related beans and applying this query to the database. When a request is made to a database to read or retrieve a set of EJB beans, related beans are simultaneously retrieved and stored in a cache. In this manner, when the client sends a request for any of these related beans, they can be supplied from the cache rather than making another call to the database.

13 Claims, 4 Drawing Sheets

SYSTEM AND METHOD FOR EAGER RELATIONSHIP CACHING OF ENTITY BEANS

CLAIM OF PRIORITY

This application claims priority from provisional application "SYSTEM AND METHOD FOR EAGER RELATIONSHIP CACHING OF ENTITY BEANS" Application No. 60/358,785 filed Feb. 21, 2002, and which application is incorporated herein by reference.

FIELD OF THE INVENTION

The invention relates generally to a system and method for caching of entity beans in a Java server environment.

BACKGROUND

An ever-increasing number of e-commerce providers or e-businesses rely on application server technology as the lifeblood of their business. Application servers form a proven foundation for developing and supporting e-commerce applications, providing the presentation, business and information-access logic, security and management services, and the underlying infrastructure required for running highly scalable and mission-critical software applications. The increasing demand of today's modern businesses require support for a new breed of Web and wireless applications, helping to meet the needs of increasingly sophisticated customers.

One such application server, WebLogic Server, from BEA Systems, Inc. San Jose, Calif., is based on an implementation of the Java 2 Enterprise Edition (J2EE) specification. WebLogic Server is used as the backbone for many of today's most sophisticated e-business applications, and plays an integral role in a tightly integrated, comprehensive infrastructure that delivers commerce, personalization, campaign management, enterprise integration, workflow management, and business-to-business collaboration. WebLogic Server manages all of the underlying complexities of a business' e-commerce applications, allows the organization to focus instead on delivering new and innovative products and services.

A typical application server, including WebLogic Server, supports a variety of clients, including Web browsers, and wireless devices. On the server side, WebLogic Server supports a variety of operating systems. On the back-end, WebLogic Server integrates with relational databases, messages queues, and legacy systems. WebLogic Server also provides support for features such as Servlets, Java Server Pages (JSPs), Enterprise JavaBeans (EJBs), and Java Messaging Service (JMS), to provide access to standard network protocols, database, and messaging systems. When developing applications, developers can create, assemble, and deploy components that use these services. To allow communication between each of these entities, application servers typically allow applications to pass messages to each other. Messages are events that contain information needed to coordinate communication between different applications. A message thus provides a level of abstraction, allowing the software developer to separate out the details about the destination system from the application, and concentrate on developing the application code itself.

The EJB architecture used by such application servers encourages portability and reuse of application code. In accordance with the industry-standard EJB specification, enterprise bean instances are created and managed at application run time by an EJB container. An EJB container is a container that provides life cycle management, security deployment and run time services to EJB components. The EJB container may provide specific services. When an enterprise bean uses only those standard services defined in the EJB specification, the bean can be deployed within any compliant EJB container. However, application vendor's specialized containers can be used to provide additional services beyond those defined by the specification.

Besides its actual implementation, the behavior of the EJB can also be defined during deployment. EJB's are deployed using a deployment descriptor, typically a computer-readable file or group of files that specifies deployment assembly information and settings. By modifying the entries within this deployment descriptor, the behavior of the EJB can be customized. This flexibility makes it easy to change behavior in an EJB within an application at a later point in time without having to make any changes to the application source code.

The EJB itself must include a minimum of three classes, including:
  A remote interface, which exposes the methods of the bean to the outside world,
  A bean class, which implements methods specified by the remote interface, and,
  A home interface which specifies how a new bean should be created, deleted or managed.

As mentioned briefly above, EJB deployment descriptors are used to contain structural application assembly information for a particular EJB. A developer or administrator specifies this information by specifying or entering values for the deployment descriptors within each of the deployment descriptor files. Typically this can be done using either a text editor, or a development console, or integrated development environment. The EJB specification mandates at least an EJB-JAR.xml file for entity bean use in defining the deployment. Other application servers may include additional deployment descriptor files, according to their particular needs for flexibility. For example, the WebLogic application server also includes a Weblogic-EJB-JAR.xml file and a Weblogic-CMP-RDBMS-JAR.xml file for use in run time deployment. Each of these xml files are packaged together with EJB and other classes to form a deployable EJB component, usually a JAR file or an EAR file. The content and arrangement of elements within each of the component xml files must conform to any document type definition (DTD) for each file used. The effect is to verify or ensure the consistency of the xml file used for deployment description.

During deployment of an EJB, the following steps are followed:
  The standard deployment descriptor and optionally any extended deployment descriptors are created, perhaps by a software developer or administrator, or more typically by an EJB deployment developer. When the application is to be provided by a third party, the third party or bean provider is responsible for creating these files.
  The administrator is then responsible for using these files to create deployable EJB-JAR files.
  The EJB deployer is started, and an EJB jar file loaded. Using the EJB deployer an administrator or EJB deployer can change setting within the deployment descriptors.
  When satisfied with the deployment description, the EJB-JAR file is then deployed. This deployment generates the container classes and adds the container classes to the EJB-JAR file.
  The final step in the deployment process is to copy the EJB-JAR file to the target server.

The EJB deployment process described above is just one example of many different deployment processes that can be used with application servers. The EJB specification does not require or mandate any particular deployment process, and hence many different deployment mechanisms are used by the variety of application server vendors within this industry. The key points that are common to most deployment processes is to create the deployment descriptor file and to use this in creating the EJB container. Other details regarding the deployment are usually left to the discretion of the application service vendor.

Types of Enterprise Java Beans

In the world of EJB objects, there are three primary types of enterprise java beans: messenger beans, session beans and entity beans. Message beans (or message-driven beans) are generated to process Java Messaging Service ("JMS") messages. Session beans, which are usually not accessible by the client, are used to perform specific tasks by the clients where only the results of that bean is returned to the client. Entity beans include a unique identifier, known as a primary key. The client does not have direct access to the primary key, but is given an interface in which to access the entity bean. Entity beans are thus commonly used for representing persistent data, providing concurrent access to that data by multiple clients, or for example, representing a single object or row of data retrieved from a database or data repository. If the state of the business object needs to be stored in persistent storage then it is typically modeled as an entity bean. Similarly when the data should be shared among multiple clients either simultaneously or within a short period of time from each other then the data object should be modeled as an entity bean. For this reason entity beans are very useful in accessing database information, particularly when loading an individual or logical record within that database. In the context of this invention, an EJB may be, for example, an entire record identifying an employees name, address and telephone number.

One common problem application servers such as described above, and with the traditional mechanism by which EJB's are provided to the client, is that little consideration is given to caching the EJB's in an efficient manner that provides for optimal speed and minimal interaction with a database or data repository. In typical e-commerce applications that retrieve data from databases or data repositories, when a client request is processed, an entity bean is created for each item or object of data retrieved from the database. The retrieved information may be cached, so that the same client (or a different client needing access to the same data) may quickly and easily retrieve it from cache. While this method results in time savings when re-reading previously read data, it provides no performance benefit when a client tries to read related, but un-queried data on subsequent attempts. Whether the subsequent data pertains to related or unrelated data, the process of determining an appropriate entity bean and retrieving it into the cache is the same. Mechanisms that can speed up this process can lead to substantial performance increases, and are highly desirable in today's e-commerce environment.

SUMMARY

The invention provides a system and method for increasing entity bean performance in an application server environment. A system that incorporates the invention reduces the need for multiple or unnecessary database queries by formulating a join query for the related beans and applying this query to the database. When a request is made to a database to read or retrieve a set of EJB beans, any related beans are simultaneously retrieved and stored in cache. In this manner, when (and if)the client sends a request for any of these related beans, they are quickly and readily available, and can be supplied from the cache rather than making another time consuming query to the database.

To use the system, a software developer must first specify the relationship between two related beans. In accordance with one embodiment, the related beans are defined by an optional <relationship-caching> tag in the document type definition file defining the entity beans. Using this <relationship-caching> tag, a developer or administrator can nest a series of beans within one another, and can easily adjust their relationships to gain the best performance advantage, without any need to re-write software code or otherwise interfere with the logic of the software itself. In a typical implementation, if eager relationship caching is enabled, a join query is issued for the current bean and related beans, and a single ResultSet is returned to the application server's container. The container then parses the ResultSet to populate the current bean(s) and related bean(s) into cache, and to set up the correct cmr-field. The information originally requested by the client is now returned. If any of the related information is requested in the future, the data is already stored in cache, saving the need to processes another database query.

DETAILED DESCRIPTION

The invention provides a system and method for increasing the performance of entity beans in an application server environment. As described above, entity beans are commonly used to provide concurrent access to database resources or other data repositories. Particularly, an entity bean can be used to represent or retrieve a single record of data from the database. In accordance with the present invention, when a client application request is received to retrieve or access an entity bean or set of entity beans, the invention also retrieves related entity beans and stores them in a cache. In this way, both the original and related entity beans are stored in the cache, providing fast access to a client when and if the client needs them. In accordance with one embodiment of the invention, the entity bean relationship is defined by an entry in the deployment descriptor file. In particular, a relationship caching tag is used within the deployment descriptor file to describe the relationship between entity beans. When one entity bean within the relationship is retrieved from the database or data repository, the related bean(s) are also retrieved.

Figure 1:
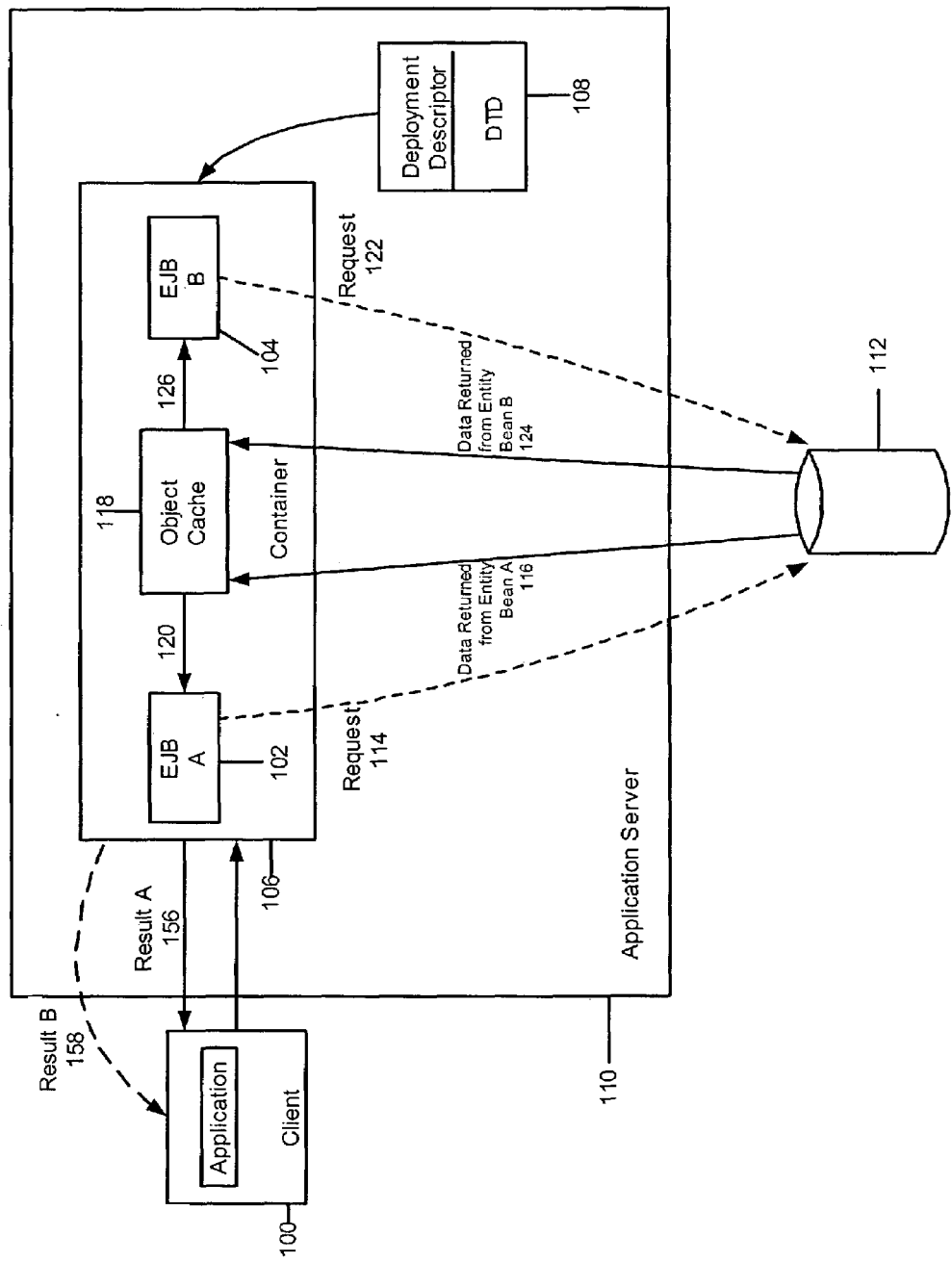
FIG. 1 shows a schematic of an application server in which eager relationship caching is not used.

FIG. 1 shows a schematic of an application server in which eager relationship caching is not used. As shown in FIG. 1, a client, including a client application 100, accesses a remote server 110. The remote server 110 has access to a database or similar data repository 112. The server also includes two EJB's 102 and 104, whose operation is defined at run time by a deployment descriptor or group of deployment descriptors 108. The content of the deployment descriptors may be specified or verified by a document type definition. During deployment of the EJBs, the deployment descriptor and document type definition are used to specify the EJB beans 102 and 104. The EJB container in turn provides life cycle management, security deployment and run time services to the entity bean or EJB components contained within.

As illustrated in FIG. 1, client application 100 may initially interact with the first EJB A 102. Container 136 takes EJB A's request 120 and sends a request 114 for data to the database 112. The resultant data is converted into an entity bean 116 and returned from the database in response to this request 114. The resultant data are typically cached in an object cache 118, before transmitting the results 156 back to the client. A subsequent and related request 126 from the client for a second EJB B, may cause a second EJB B 104 to send a data request 122 to the database 112. The data from the second request is also converted into an entity bean 124 and placed in cache 118 before returning the result 158 to the client. While the object cache of FIG. 1 serves a useful purpose in caching previously retrieved entity beans for future use by the same or different applications, it serves no intelligent purpose in caching related entity beans that may or may not be used by the application.

Figure 2:
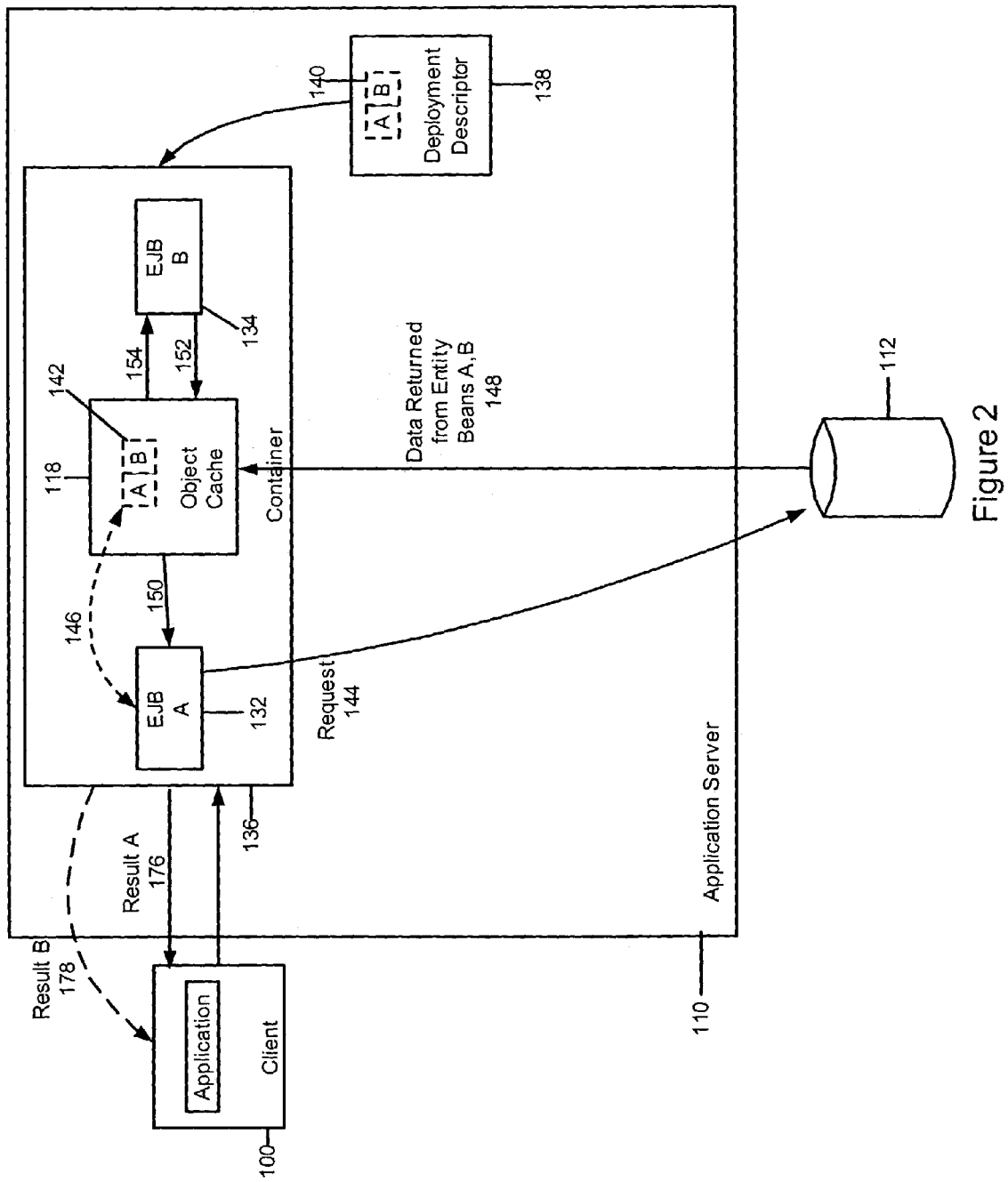
FIG. 2 shows a schematic of an application server that does use eager relationship caching.

FIG. 2 shows a schematic of an application server that uses eager relationship caching to cache related entity beans following an initial request to the database. As shown in FIG. 2, a client including a client application 100 similarly accesses a remote server 110 that has access to a database or data repository 112. This time however, the deployment descriptor file (including any necessary document type definitions) 138, is used to specify a relationship 140 between two entity beans. In the example shown in FIG. 2, a first and second EJB (A and B respectively) are defined in such a way that the data to be returned to EJB B 134 is logically related to the data to be returned to EJB A 132. The schematic illustration of FIG. 2 is given purely for illustrative purposes. It will be apparent to one of skill in the art that the relationship between entity beans A and B, as defined within the deployment descriptor, may typically be defined in purely text-based terms. In accordance with the invention of FIG. 2, when a request from a client application 100 is received at the server 110, the EJB container 136 includes the necessary information that defines the relationship 142 between two or more EJB's (and corresponding entity beans). As before, a request for EJB A 150, causes the container 136 to send a request from entity bean A to retrieve data 144 from the database 112, which results in the data (again, In the form of an entity bean) 148 being stored in the object cache 118. The result 176 is then returned to the client application. However, since the container knows about the relationship between entity beans A and B 142, it can use this relationship information 148 to tell the container 136 to not only return information or entity beans related to that EJB, but also related entity beans related to EJB B.

In this manner, when EJB B is called by the client to retrieve a set of information, the necessary information is already stored in the object cache 118. The container 136 takes EJB B's request 154 and retrieves this information 152 directly from the cache and return the data 178 to the client. In accordance with this mechanism, only a single call to retrieve data from the database is required in order to satisfy both requests. This results in substantial savings in time, and improvements both in performance and scalability of the application server.

Figure 3:
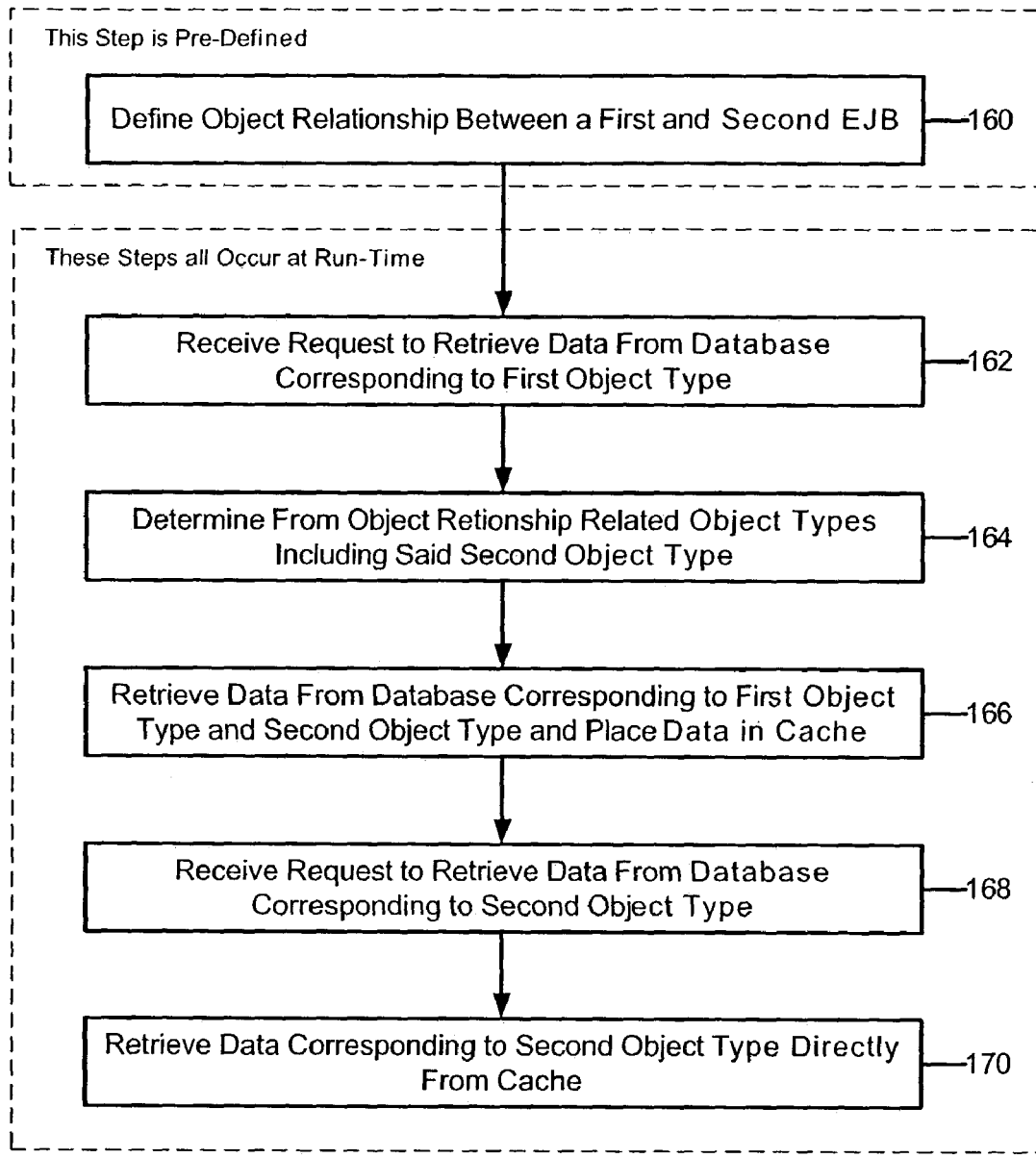
FIG. 3 shows a flowchart of a method used to retrieve and cache EJB's using eager relationship caching.

FIG. 3 shows a flow chart of a method used to retrieve and cache EJB objects, such as entity beans, using eager relationship caching. As shown in FIG. 3, step 160 shows that an object relationship is defined between a first and second object type. In the embodiment described, the object types are entity beans, although it will be evident to one skilled in the art that other object types can be used. In step 162 the system receives a request from a session bean, via the client or client application, to retrieve data from the database corresponding to the first object type. Since, during the deployment phase, the EJB container is aware of the object relationship between the two object types, it can retrieve this object relationship in step 164. In step 166 data is retrieved from the database corresponding to the first object type and the second object type. The data is parsed into separate objects and is placed in the object cache for further use. At a later point in time, at step 168 the system may receive a request from a session bean, via the client, to retrieve database information that corresponds to the second object type. Since this data has already been retrieved and stored in the cache using eager relationship caching, the data may be retrieved directly from the cache 170 rather than by making another call to the database. It should be noted that step 160 is a pre-defined step, whereas all the other steps occur at run-time.

Figure 4:
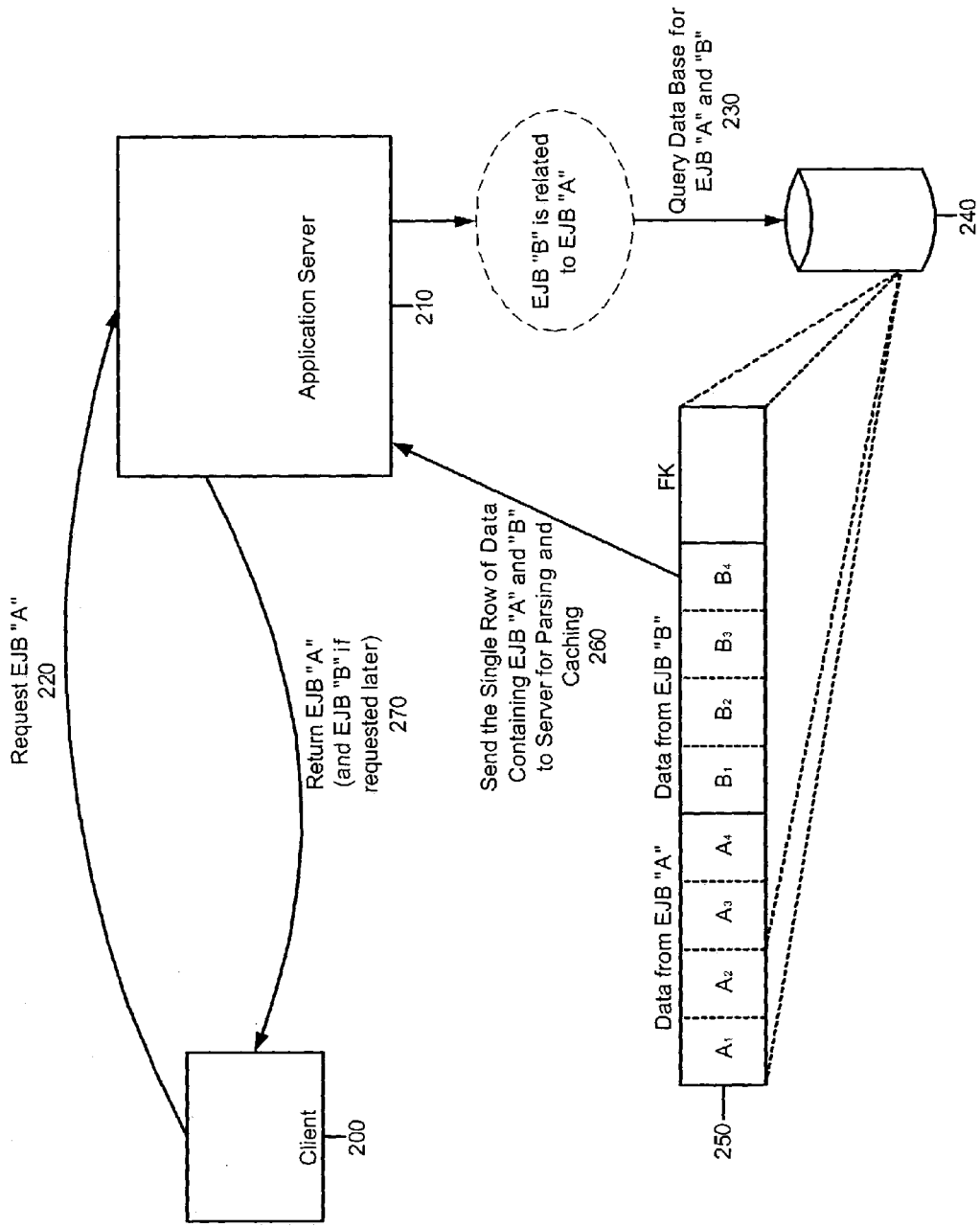
FIG. 4 shows a schematic of eager relationship caching and the format in which data is returned from a database or data repository.

FIG. 4 shows the use of eager relationship caching in accordance with one embodiment of the invention, and how the data returned from two related beans are logically represented as a single row of data. Included in this row of data is a foreign key. As shown in FIG. 4, a client 200 makes a request "A" 220 to a remote server 210. The data represented by request A is placed in EJB A. A pre-defined relationship has already been established between EJB A and EJB B. The server sends a query 230, containing EJB A and EJB B, to a database or data repository 240. An important feature of FIG. 4 is the structure (row) 250, which illustrate the format in which data is returned. In a simple data request where a single row of data is returned from EJB A, EJB B may also return a single row of related data. The logical structure 250 shows that these two rows of data are returned from the data repository as a combined, single row containing both EJB A and EJB B, along with a foreign key (FK). In the figure, fields $A_1$-$A_4$ represents the individual fields of data from EJB A. Fields $B_1$-$B_4$ represents the individual fields of data from EJB B. The foreign key could be placed at any point within the row, as long as the parser is aware of its placement. The foreign key acts as unique identifier for this row. The key is often created from a sequential number or a concatenation of the results of EJB A and EJB B. The row of data 250 is then sent back to the server 210, where the row is parsed by the container into separate entity beans and placed in cache. This way, the data from EJB A can be individually sent 270 back to the client. If the data from EJB B is later requested by the client, this can then be directly sent from the cache.

It is also possible n some embodiments to have more than one related bean. Instead of EJB A and EJB B, there could also be an EJB C, which could be directly related to EJB B. In this case, the data returned by the data repository 240 will still be in the form of a single row, but will contain data from all three beans. Once this row of data is sent to the server, the single row of data is parsed, by the container, into three separate entity beans, placed in cache and then sent to the client upon request.

In another embodiment, EJB A may still return a single row of data, but EJB B may have multiple rows, due to a one to many relationship. An example might be that EJB A contains customer data, whereas EJB B contains a single row for each investment account owned by the customer. In such a scenario, multiple rows of data could be returned if a given customer had more than one account. The first row would represent the single row returned by EJB A, followed by the first row returned by EJB B ($B_1$), followed by a foreign key for this row. A second row of data would return the same row from EJB A(since this is a one to many relationship) and a new row of data returned by EJB B ($B_2$) followed by a new foreign key.

In another embodiment, EJB A can return multiple rows of data, and each corresponding EJB B can also have multiple rows, creating a many to many relationship. In such a scenario, each row of data returned from the data repository will represent each combination of unique rows from EJB A and EJB B. For example, a given query might return three unique rows for EJB A and each of those could have three unique rows for EJB B. This would create nine unique rows of data that would come from the data repository.

IMPLEMENTATION EXAMPLE

A typical implementation that uses the invention is described in further detail below with reference to an exemplary personnel database application. It will be evident to one skilled in the art that some of the features described below are general to all object based systems, while others are specific to certain application servers. It will be further evident to one skilled in the art that the principles described below are generally applicable to other application server environments.

As described above, a primary objective of the invention is to increase entity bean performance by loading related beans into a cache, and to avoid multiple queries by issuing a join query for the related beans. In accordance with one embodiment, the related beans are defined by an optional <relationship-caching> tag in the entity beans. Eager Relationship caching loads the related beans into cache based on this <relationship-caching> tag, which is in turn added to the weblogic-rdbms20-persistence-700.dtd document type definition file.

For example, assume the customerBean, accountBean, addressBean and phoneBean have the following relationship:

customerBean 1:m accountBean 1:1 addressBean customerBean 1:1 phoneBean

The first step in the process of caching objects using eager relationship caching is to specify the actual caching relationship to be used for those objects. To specify eager relationship caching from the customerBean, the developer can define the following in the <weblogic-rdbms-bean> for the customerBean:

```
<relationship-caching>
    <caching-name>cacheMoreBeans</caching-name>
    <caching-element>
        <cmr-field>accounts</cmr-field>
        <group-name>acct_group</group-name>
        <caching-element>
            <cmr-field>address</cmr-field>
            <group-name >addr_group</group-name>
        </caching-element>
    </caching-element>
    <caching-element>
        <cmr-field>phone</cmr-field>
        <group-name>phone_group</group-name>
    </caching-element>
</relationship-caching>
```

In the above example the customer 'accounts' and 'phone' fields are the <cmr-field> in the customerBean. Also in the example shown, the 'address' is a <cmr-field> in the accountBean; 'acct_group' is a <group-name> in the accountBean; and the 'addr_group' and 'phone_group' are <group-name> in the addressBean and phoneBean. In this example, there is no direct relationship between the customerBean and the addressBean. The accountBean provides the needed relationship between customerBean and addressBean.

Using a nested <caching-element> in this manner enables the bean to load more than one level of related beans. In the above example, addressBean is the second level related bean since it is nested in the accountBean.

It is always possible to create multiple levels of caching relationships and specify more nested caching elements. For example another bean called tempaddressBean could be created that is nested within the addressBean that has a one to one relationship with it. This new bean may not relate to any other bean accept for addressBean, hence this new bean could be considered a third level related bean. In theory, an unlimited level of caching relationships could be created, however a developer or administrator should also note that setting up too many levels of <caching-element> can potentially impact the performance of the current transaction. But such options are available and by no means limited to one or two levels of relationship caching.

The next step in using eager relationship caching is to actually enable caching for the system. In WebLogic, to enable eager relationship caching, the <caching-name> tag is added to <weblogic-query> or <field-map> tag. If the above <caching-name> is specified in <weblogic-query> or <field-map>, when the finder query is executed, customerBean and the related accountBeans and phoneBean, as well as account's addressBeans will be loaded into the cache.

Database Specifications

In one embodiment of the invention, the eager relationship caching process uses an outer join within the database query. However, outer joins do not have a standard syntax for all relational databases on the market. To address this, a <database-type> tag must be added to the <weblogic-rdbms-jar> limitation.

Limitations

There are also a few limitations for this feature:
1. This feature will only work with 1:1 and 1:m relationships.
2. For <weblogic-ql>, this feature will only work with finder methods or select methods that has a return type of 'Object'.

Performance Considerations

Since eager relationship caching uses a join query, and a join query might generate duplicate results for a table in the ResultSet, the number of <caching-element> tags specified in the <relationship-caching> tag will have direct impact on the number duplicate results in the ResultSet. The number of duplicate results might multiply for each <caching-element>, so the developer or administrator should not specify too many numbers of <caching-element> tags within the <relationship-caching> tag. There are no limitations on the number of <caching-element> that can be specified.

DTD Changes/Deployment Descriptor

The eager relationship caching can be specified in <weblogic-rdbms-bean>.

```
<!ELEMENT weblogic-rdbms-bean (
    ejb-name,
    data-source-name,
    table-name,
    field-map*,
    field-group*,
```

The following are the tags used to specify the eager relationship caching feature within the weblogic-rdbms20-persistence-700.dtd. The following tag is used in field-group and weblogic-rdbms-bean to specify eager relationship caching:

```
<!ELEMENT relationship-caching (
    caching-name,
    caching-element+
) >
```

The name of an eager relationship caching:

```
<!ELEMENT caching-name (#PCDATA)>
```

The following tag is used in relationship-caching to specify the cmr-field for the related bean, and the group-name in the related bean. If group-name is not specified, the default group-name (load all fields) will be used:

```
<!ELEMENT caching-element (
    cmr-field,
    group-name?,
    caching-element*
) >
```

The eager relationship caching can be enabled in <weblogic-query> or <field-map>:

```
<!ELEMENT field-map (
    cmp-field,
    dbms-column,
    dbms-column-type?,
    group-name?,
    caching-name?
) >
<!ELEMENT weblogic-query (
    description?,
    query-method,
    weblogic-ql?,
    group-name?,
    caching-name?,
    max-elements?,
    include-updates?,
    sql-select-distinct?
) >
```

The following is the <database-type> tag:

```
<!ELEMENT weblogic-rdbms-jar (
    weblogic-rdbms-bean+,
    weblogic-rdbms-relation*,
    create-default-dbms-tables?,
    validate-db-schema-with?,
    database-type?
) >
```

The following tag is used to specify the database type of the underlying DBMS. The database-type can be one of the following currently supported values (although it will be evident that others could be used):

```
    DB2
    INFORMIX
    ORACLE
    SQL_SERVER
    SYBASE
<!ELEMENT database-type (#PCDATA)>
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application server environments may use and benefit from the invention. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for caching of entity beans in a server environment, comprising:
   a deployment descriptor file that stores one or more caching element tags for specifying a set of user specified relationships among a plurality of beans wherein said caching element tags are nested to implement multiple levels of related beans such that a bean loads more than one level of related beans;
   a server that receives a request from a client to retrieve data from a database corresponding to a first bean and determines an object relationship by parsing the caching element tags in the deployment descriptor file in order to retrieve data for both the first bean and a second bean from the database, as specified by an object relationship determined by the server in parsing the deployment descriptor file and wherein the server also simultaneously retrieves a third bean that is not directly related to the first bean, such that retrieval of the third bean is based on the object relationship between the second bean and the third bean;

an object cache for temporary storage of the data for the first bean, the second bean, and the third bean; and, wherein a request from a client to retrieve database information corresponding to the second bean causes the server to retrieve data for the second bean directly from the cache, without making another call to the database; and wherein performance of the object cache is adjusted by setting up multiple levels of caching relationships among the beans by nesting said cache elements within one another in the deployment descriptor.

2. The system of claim 1 wherein the object relationship is between a plurality of beans.

3. The system of claim 1 wherein the beans are entity Java beans.

4. The system of claim 1 wherein the server retrieves data for said first bean and said second bean from the database by forming a join query for the two or more beans and applying said join query to the database.

5. A method for caching of entity beans in a server environment, comprising the steps of:

providing a deployment descriptor file that contains one or more relationship caching tags for defining a set of user specified relationships among a plurality of beans wherein said relationship caching tags are nested within one another to implement multiple levels of caching relationships such that a bean loads more than one level of related beans;

specifying an object relationship between a first bean and a second bean and storing the relationship as a relationship caching tag in the deployment descriptor file;

adjusting, by the user, said relationship caching tags in the deployment descriptor file in order to gain an optimal caching performance of an object cache, wherein the caching performance is adjusted by selling up multiple levels of relationships via nesting said caching tags;

receiving a request from a client to retrieve data from a database corresponding to the first bean;

parsing the set of nested user specified relationships in the deployment descriptor file in order to determine the object relationship between the first bean and the second bean;

retrieving data for both first bean and second bean from the database, as specified by said object relationship and simultaneously retrieving a third bean that is not directly related to the first bean, wherein retrieval of the third bean is based on the object relationship, between the second bean and the third bean;

deploying the first bean, the second bean and the third bean in an object cache;

receiving a request from a client to retrieve database information corresponding to the second bean; and, retrieving data corresponding to said second bean directly from said object cache, without making another call to the database.

6. The method of claim 5 wherein the object relationship is between a plurality of beans.

7. The method of claim 5 wherein the beans are entity Java beans.

8. The method of claim 5 wherein the server retrieves data for said first bean and said second bean from the database by forming a join query for the two or more beans, and applying said join query to the database.

9. The system of claim 1, wherein the relationship between the plurality of beans is predefined via a relationship-caching tag in a document type definition file.

10. The method of claim 5, wherein the relationship between the plurality of beans is predefined via a relationship-caching tag in a document type definition file.

11. A computer readable medium having instructions stored thereon which when executed by one or more processors cause a system to:

provide a deployment descriptor file that contains one or more relationship caching tags for defining a set of user specified relationships among a plurality of beans wherein said relationship caching tags are nested within one another to implement multiple levels of caching relationships such that a bean loads more than one level of related beans;

specify an object relationship between a first bean and a second bean and storing the relationship as a relationship caching tag in the deployment descriptor file;

adjust, said relationship caching tags in the deployment descriptor file in order to gain an optimal caching performance of an object cache, wherein the caching performance is adjusted by setting up multiple levels of relationships via nesting said caching tags;

receive a request from a client to retrieve data from a database corresponding to the first bean;

parse the set of nested user specified relationships in the deployment descriptor file in order to determine the object relationship between the first bean and the second bean;

retrieve data for both first bean and second bean from the database, as specified by said object relationship and simultaneously retrieve a third bean that is not directly related to the first bean, wherein retrieval of the third bean is based on the object relationship between the second bean and the third bean;

deploy the first bean, the second bean and the third bean in an object cache;

receive a request from a client to retrieve database information corresponding to the second bean; and, retrieving data corresponding to said second bean directly from said object cache, without making another call to the database.

12. The computer readable medium of claim 11 wherein the behavior of the plurality of beans is defined during deployment.

13. The computer readable medium of claim 11 wherein retrieving data for the first bean and second bean from the database further includes returning a result set of data containing a foreign key.

* * * * *

UNITED STATES PATENT AND TRADEMARK OFFICE
CERTIFICATE OF CORRECTION

PATENT NO.        : 7,464,069 B2                                                      Page 1 of 1
APPLICATION NO.   : 10/369433
DATED             : December 9, 2008
INVENTOR(S)       : Chen et al.

It is certified that error appears in the above-identified patent and that said Letters Patent is hereby corrected as shown below:

On sheet 3 of 4, in Figure 3, Ref. Numeral 164, line 1, delete "Retionship" and insert -- Relationship --, therefor.

In column 1, line 4, above "Claim Of Priority" insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 4, line 3, delete "if)the" and insert -- if) the --, therefor.

In column 5, line 7, before "client" insert -- the --.

In column 5, line 47, delete "In" and insert -- in --, therefor.

In column 5, line 51, delete "148" and insert -- 146 --, therefor.

In column 6, line 6, delete "EJBA" and insert -- EJB A --, therefor.

In column 11, line 45, in claim 5, delete "selling" and insert -- setting --, therefor.

In column 11, line 57, in claim 5, delete "relationship," and insert -- relationship --, therefor.

Signed and Sealed this

Twenty-seventh Day of April, 2010

David J. Kappos
*Director of the United States Patent and Trademark Office*